US 6,735,161 B1

(12) United States Patent
Sato et al.

(10) Patent No.: US 6,735,161 B1
(45) Date of Patent: May 11, 2004

(54) RECORDING-MEDIUM TRANSFER DEVICE

(75) Inventors: Michihiro Sato, Yamagata-ken (JP);
Nobuyuki Sato, Yamagata-ken (JP);
Hideyuki Takahashi, Yamagata-ken (JP); Tetsuya Niino, Yamagata-ken (JP); Noritaka Kunimaru, Saitama-ken (JP); Shigeharu Furusawa, Saitama-ken (JP); Yasuhiro Shinkai, Saitama-ken (JP)

(73) Assignees: Pioneer Corporation, Tokyo (JP);
Tohoku Pioneer Corporation, Yamagata (JP)

( * ) Notice: Subject to any disclaimer, the term of this patent is extended or adjusted under 35 U.S.C. 154(b) by 0 days.

(21) Appl. No.: 09/421,282

(22) Filed: Oct. 20, 1999

(51) Int. Cl.$^7$ ............................................ G11B 17/04
(52) U.S. Cl. ..................................................... 369/77.1
(58) Field of Search ............................ 369/75.1, 75.2, 369/77.1

(56) References Cited

U.S. PATENT DOCUMENTS

| | | | | |
|---|---|---|---|---|
| 4,592,039 A | * | 5/1986 | Toyoguchi et al. | 369/75.2 |
| 5,022,023 A | * | 6/1991 | Toyoguchi | 369/77.1 |
| 5,031,169 A | * | 7/1991 | Kato et al. | 369/75.2 |
| 5,084,855 A | * | 1/1992 | Kobayashi et al. | 369/75.2 |
| 5,467,334 A | * | 11/1995 | Kim | 369/77.1 |
| 5,650,990 A | * | 7/1997 | Choi | 369/77.2 |
| 5,719,844 A | * | 2/1998 | Abe | 369/77.1 |
| 5,828,641 A | * | 10/1998 | Abe et al. | 369/77.1 |

FOREIGN PATENT DOCUMENTS

| | | | |
|---|---|---|---|
| JP | 9-102158 | * | 4/1997 |
| JP | 10-106101 | * | 4/1998 |

* cited by examiner

Primary Examiner—William Klimowicz
(74) Attorney, Agent, or Firm—Arent Fox Kintner Plotkin & Kahn, PLLC

(57) ABSTRACT

A recording-medium transfer device having a anti-rattle construction is provided. A transfer roller 6 of the recording-medium transfer device is arranged above a chassis 5 to be perpendicular to a direction X of transferring recording medium. The transfer roller 6 has a structure in which a shaft is inserted in rolling member made of a material having flexibility. Projecting portions 13 and 14 are formed on the chassis 5 to oppose to both ends of the rolling member. In both ends of the rolling member, clearances are respectively formed to permit the deformation produced by its abutment with the projecting portions 13 and 14. In the process for inserting the disc, the projecting portions 13 and 14 are moved away from the transfer roller 6. Upon receiving a driving force from a driving motor 7 and gears 8 to 11, the rolling member of the transfer roller 6 is rotated keeping in contact with the disc so as to transfer the disc toward a clamping position. When the transfer of the recording medium is completed, both ends of the rolling member press on the projecting portions 13 and 14, thereby the transfer roller 6 is fixed to the chassis 5 so as to prevent chatter due to outside vibration from occurring.

9 Claims, 13 Drawing Sheets

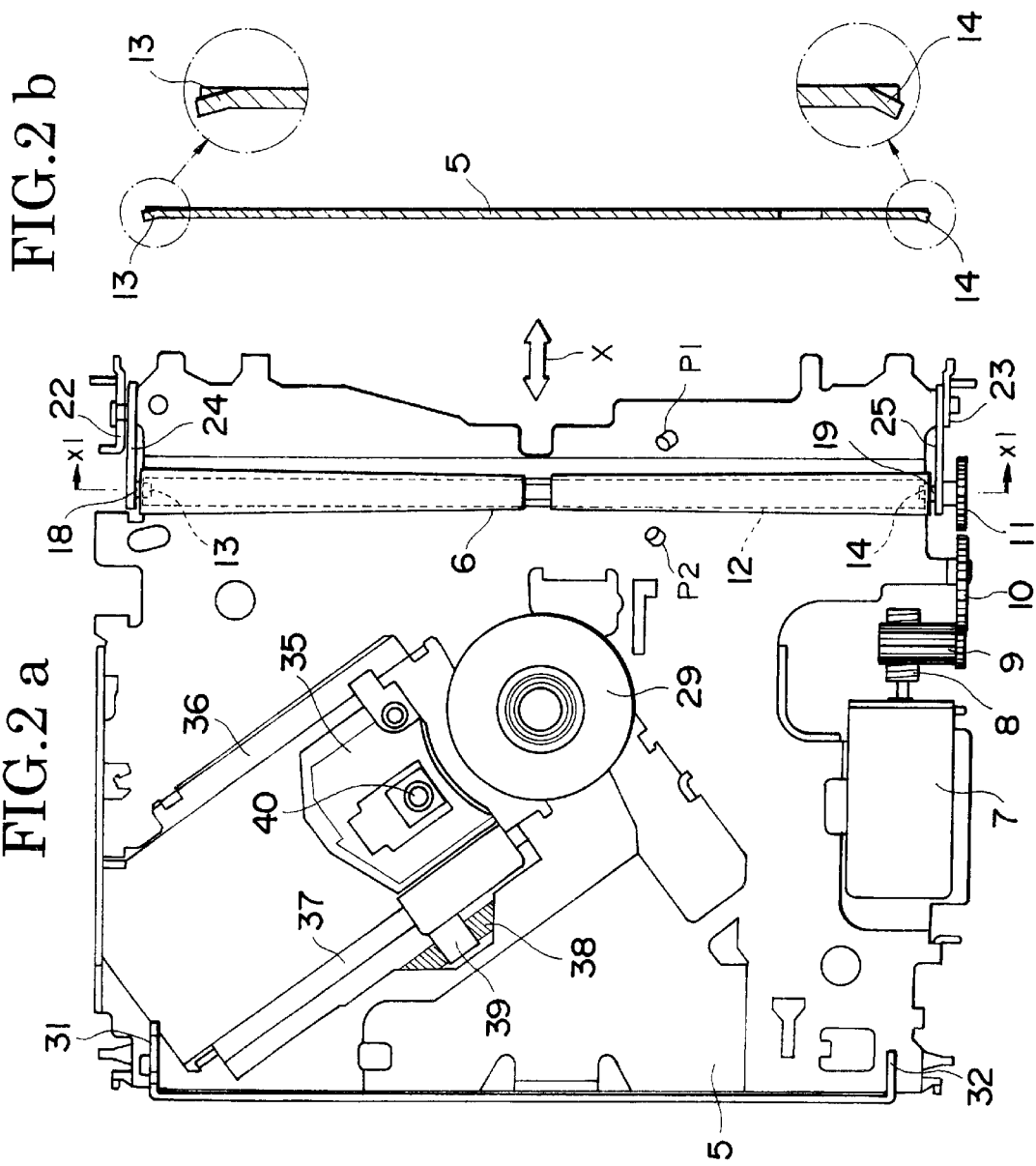

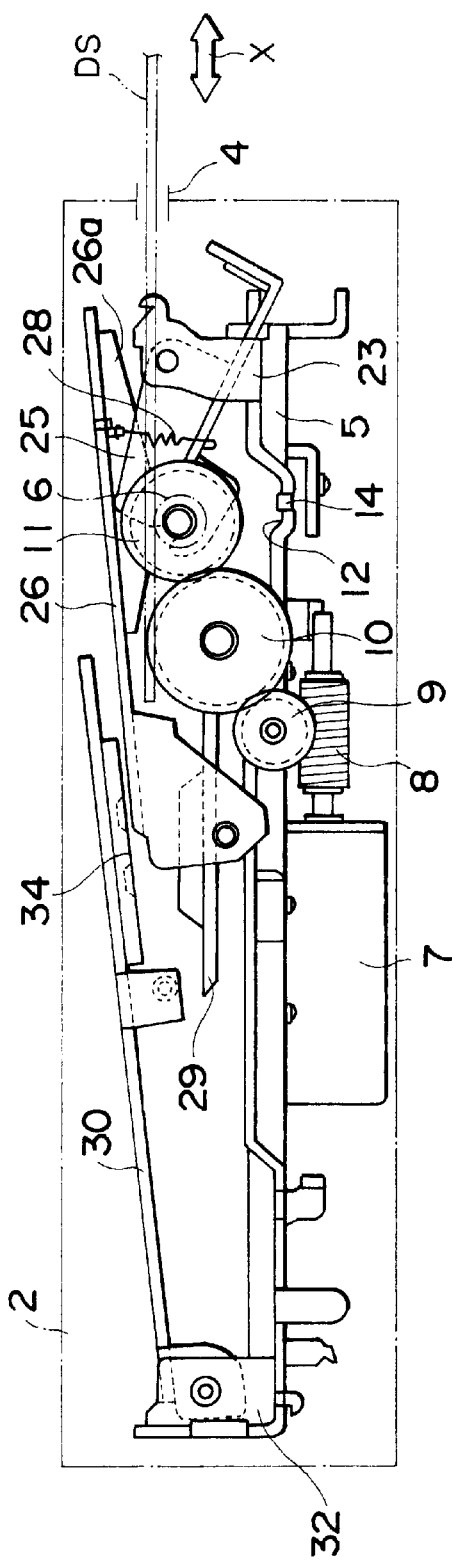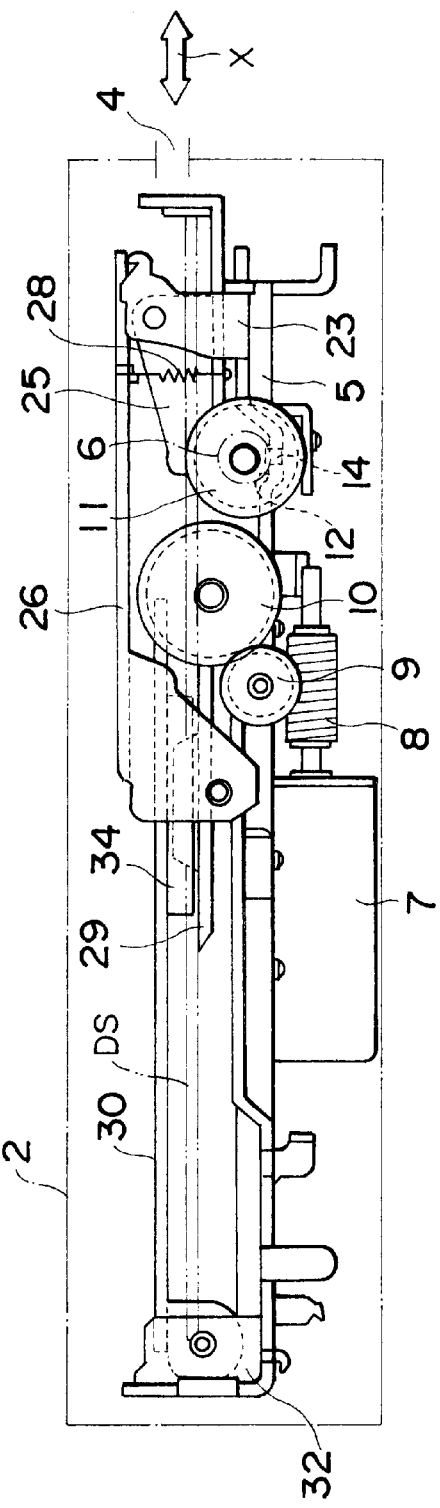

FIG.7 a
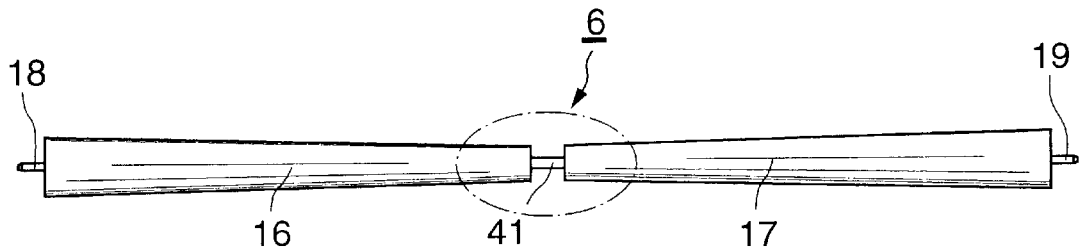
FIG.7 b
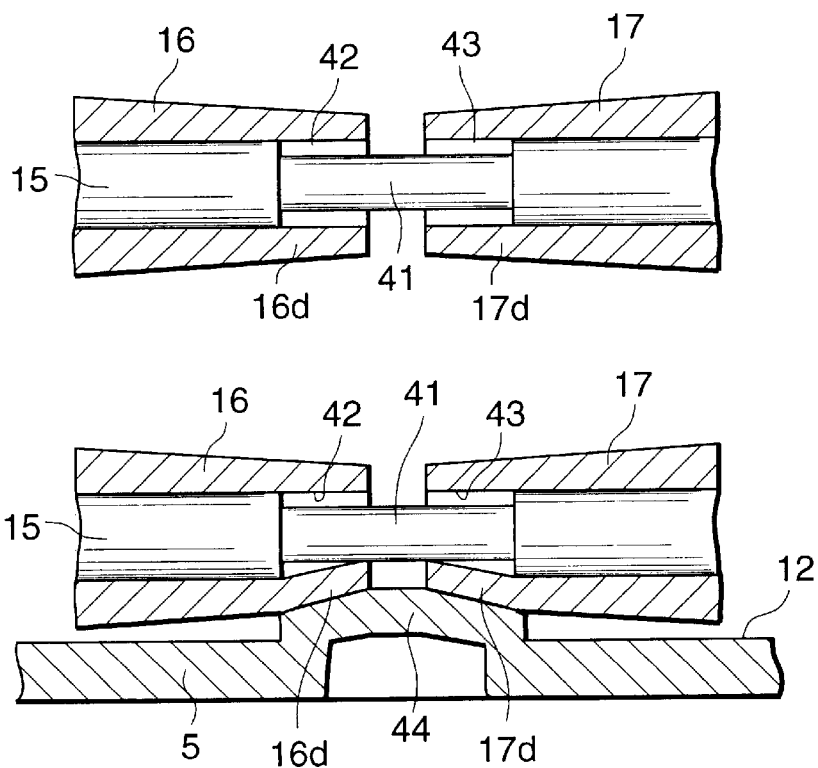
FIG.7 c

FIG.8 a
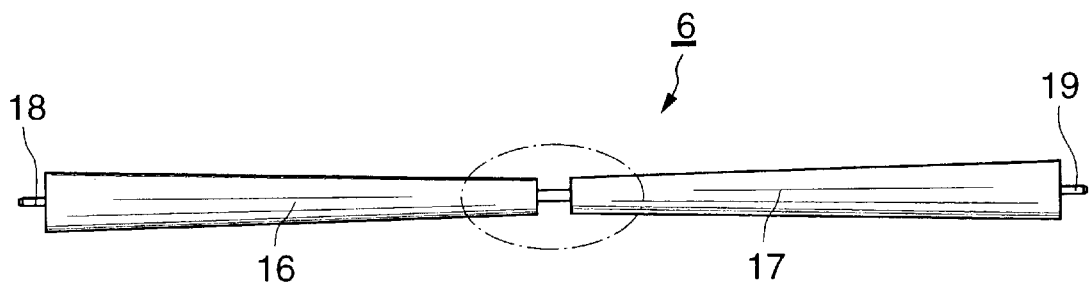
FIG.8 b
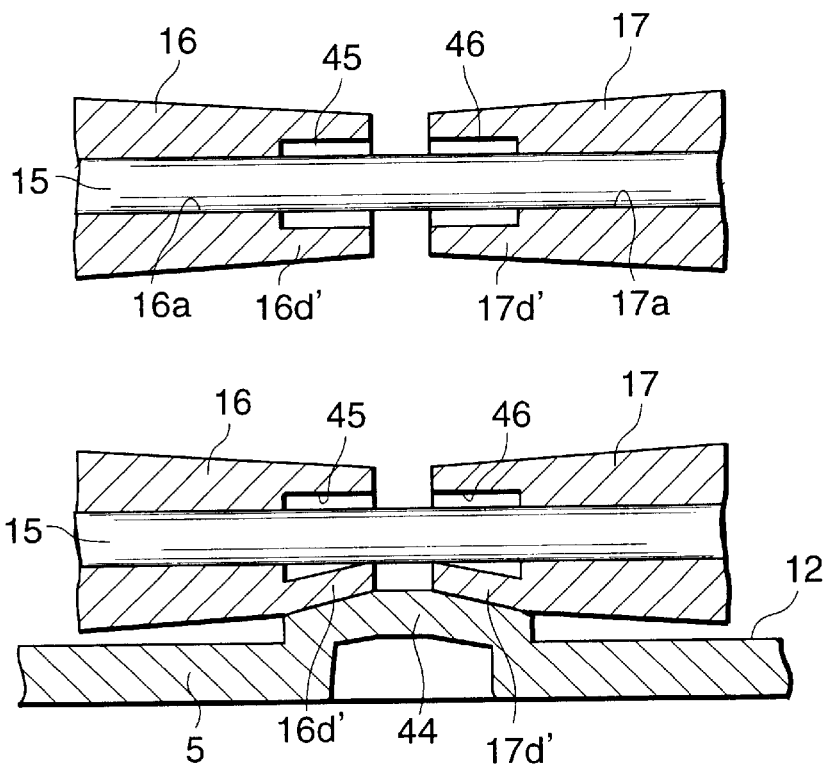
FIG.8 c

RECORDING-MEDIUM TRANSFER DEVICE

BACKGROUND OF THE INVENTION

This invention relates to a recording-reproducing device using a recording medium and, more particularly, to a recording-medium transfer device for transferring a recording medium for recording, reproducing or the like.

As recording-medium transfer devices provided in recording-reproducing devices using a recording medium, conventionally, devices disclosed in Japanese Patent Publication No. 6-9097 and Japanese Utility model Publication No. 6-14317 are known.

The recording-medium transfer devices as described in those references are provided for transferring a disc, such as CD (Compact Disc) or DVD (Digital Video Disc or Digital Versertile Disc), to a clamp mechanism to allow an optical pickup to record or reproduce. This recording-medium transfer device is composed of a disc guide provided along an opening, a transfer roller arranged just after the disc guide, a driving motor for driving the transfer roller, and a photosensor arranged in front of the transfer roller.

After a user inserts a disc along the disc guide in the opening, the photosensor optically detects an insert edge of the disc and starts the driving motor. Upon receiving a driving force from the driving motor, the transfer roller rotates in a predetermined direction keeping in contact with the disc, to automatically transfer the disc to the clamp mechanism. After the disc reaches a predetermined position (clamping position) in the clamp mechanism, the rotation of transfer roller is stopped, and the clamp mechanism cramps the disc, so as to allow the optical pickup to reproduce or record.

On the other hand, when the user operates the ejection switch to eject the disc loaded in the clamp mechanism, the clamp mechanism releases the disc while the transfer roller starts to rotate in reverse coming in contact with the disc, to mechanically transfer the disc back to the opening. When the aforementioned inserted edge portion of disc reaches a position at which the disc comes in contact with the transfer roller, the transfer roller is adapted to stop its rotation in order to prevent the disc from ejecting excessively.

In the conventional recording-medium transfer device as described above, the transfer roller is driven only when ejecting and loading the disc, and otherwise is inactive. For example, when the disc is not inserted in the recording-reproducing device or when the disc is loaded in the clamp mechanism, the transfer roller is halted.

However, since the transfer roller is not a stationary member that is simply structured to fasten in the recording-reproducing device, but being a movable member which is rotatably supported by a bearing mechanism or the like, the transfer roller cannot be retained in a completely immobile state even when inactive as described above. For example, if the recording-reproducing device receives vibration from the outside, the transfer roller also receives the vibration, which may cause it to unintentionally rotate or move slightly with respect to a supporting portion of the bearing mechanism. As described above when the transfer roller moves even slightly, vibration causing undesirable chatter or the like is produced by the movement of the transfer roller, resulting in fear annoying the user. In addition, during the reproduction of the disc, sound may skip due to the undesirable vibration accompanied with chatter or the like.

Especially, a recording-reproducing device for mounting on a vehicle is used under particular conditions in which a transfer roller thereof easily vibrates. Accordingly, the necessity of an anti-rattle construction for preventing the occurrence of disadvantages as described above is increased.

The inventors of the present application researched appropriate measures to design and assemble the transfer roller and the supporting portion of the bearing mechanism with extreme accuracy so as to dissolve the occurrence of rattle in the supporting portion. However, since the transfer roller is the movable member as described above, irregularities, for example, resonance at a specific frequency due to the outside vibration and change of resonance frequency by the individual differences of the transfer roller, are involved, resulting in difficulties in designing an optimal anti-rattle construction.

The provision of the recording-medium transfer device with the anti-rattle construction by the above measures also has disadvantages that the structure is complicated and the cost is increased.

SUMMARY OF THE INVENTION

In view of the conventional disadvantages as described above, it is an object of the present invention to provide a recording-medium transfer device having anti-rattle properties and capable of substantially reducing skipping of sound caused by outside vibration.

To attain the object, the present invention provides a recording-medium transfer device for transferring a recording medium from a predetermined inserting position to a predetermined loading position or for ejecting the recording medium from the predetermined loading position to the predetermined inserting position, comprising at least one transfer roller for transferring and ejecting the recording medium, and abutment means for relatively pressing on an end of the transfer roller, in which at least the end of the transfer roller pressed by said abutment means is made of an elastic material, and a clearance is formed in the transfer roller to permit deformation of the above end which is produced through being pressed by the abutment means.

According to the present invention as described above, when a transfer roller is moved away from a disc, abutment means relatively presses an end portion of the transfer roller. The end portion having flexibility is deformed by being pressed, thereby increasing contact resistance between the abutment means and the transfer roller. In consequence, after completing of a loading process or an ejecting process, the transfer roller can be fixed to the abutment means so as not to move due to outside vibration or the like, resulting in achievement of a recording-medium transfer device having the silent construction based on the anti-rattle treatment.

The above and other objects, features and advantages of the invention will be more apparent from the following detailed description taken in conjunction with the accompanying drawings.

BRIEF DESCRIPTION OF THE DRAWINGS

FIG. 2(a) is a plane view showing an arrangement of a recording-medium transfer device integrated in the recording-reproducing device for the vehicle in accordance with a preferred embodiment of the present invention, and FIG. 2(b) is a fragmentary sectional view taken along the X1—X1 line in FIG. 2(a).

FIG. 3(a) and FIG. 3(b) are respectively side elevational views showing the arrangement from a side face of the recording-medium transfer device.

FIG. 7(a) to FIG. 7(c) are respectively diagrams illustrating a structure of another modification of the transfer roller.

FIG. 8(a) to FIG. 8(c) are respectively diagrams illustrating a structure of still another modification of the transfer roller.

DETAILED DESCRIPTION OF THE PREFERRED EMBODIMENTS

Figure 1:
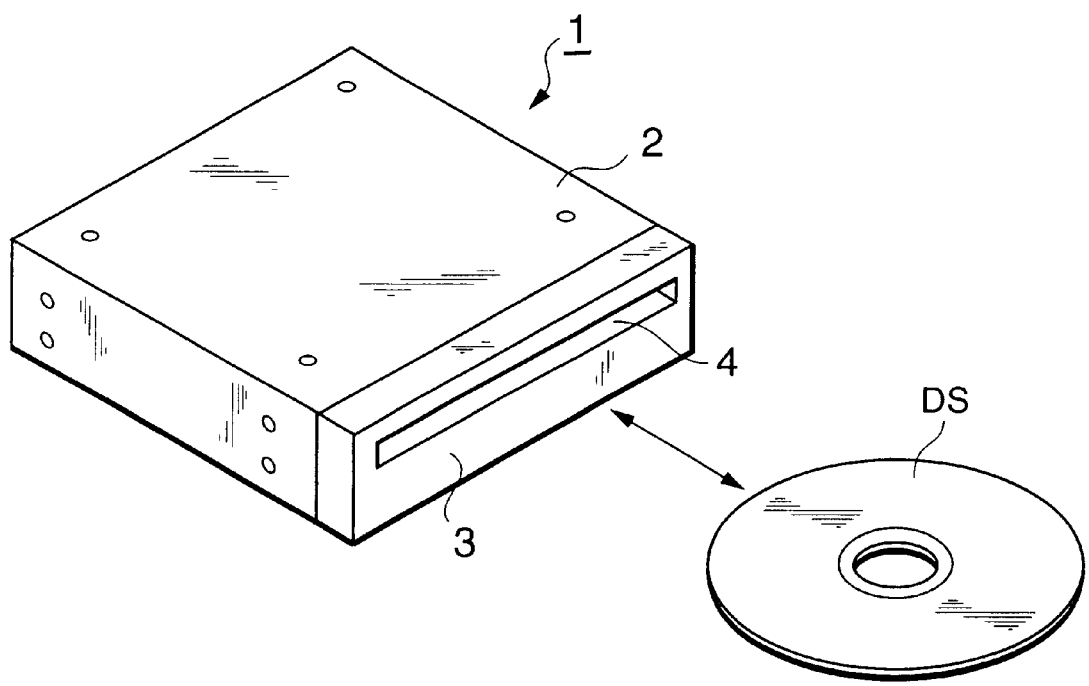
FIG. 1 is a perspective view showing the appearance of a recording-reproducing device for mounting on a motor vehicle in accordance with preferred embodiments of the present invention.

The preferred embodiments of a recording-medium transfer device applied in a recording-reproducing device for mounting on a motor vehicle using a recording medium (referred to as "disc" hereinafter), such as CD or DVD, will be described below with reference to the accompanying drawings.

(First Embodiment)

The first embodiment will be explained with reference to FIG. 1 to FIG. 9. As shown in a perspective view of FIG. 1, in the recording-reproducing device 1, a front panel 3 is attached on an approximately rectangular shaped case 2. After a user inserts an edge portion of a disc DS, such as CD or DVD, into a slit shaped opening 4 formed on the front panel 3, a recording-medium transfer device provided in the case 2 mechanically performs the loading of the disc DS. When the user operates an ejection switch (ejection button) (not shown), the recording-medium transfer device mechanically transfers back the disc DS loaded in the case 2, to eject it from the opening 4.

FIG. 2(a) is a plane view showing an arrangement of the recording-medium transfer device integrated in the case 2. FIG. 3 and FIG. 4 are respectively side elevational views showing the arrangement of the recording-medium transfer device as seen from the both sides. FIG. 5 illustrate a structure of a transfer roller.

In FIG. 2(a), the recording-medium transfer device is composed of a transfer roller 6 arranged above a metallic chassis 5, a driving motor 7, a plurality of gears 8 to 11 for transmitting a driving force of the driving motor 7 to the transfer roller 6, an elongated recess portion 12 formed on the chassis 5 to oppose to the transfer roller 6, and projecting portions 13 and 14 respectively projected from both ends of the recess portion 12 toward the transfer roller 6.

On the chassis 5, at least a pair of photosensors P1 and P2 is mounted on both sides of the transfer roller 6, of which the photosensor P1 detects that the disc DS is inserted and the photosensor P2 detects that the disc DS reaches a position for being ejected.

As shown in FIG. 2(b) illustrating the sectional structure of the chassis 5 which is taken along the X1—X1 line in FIG. 2(a), the projecting portions 13 and 14 are integrally formed on the chassis 5 at respective both ends of the recess portion 12 by a bending process.

Figure 5A:
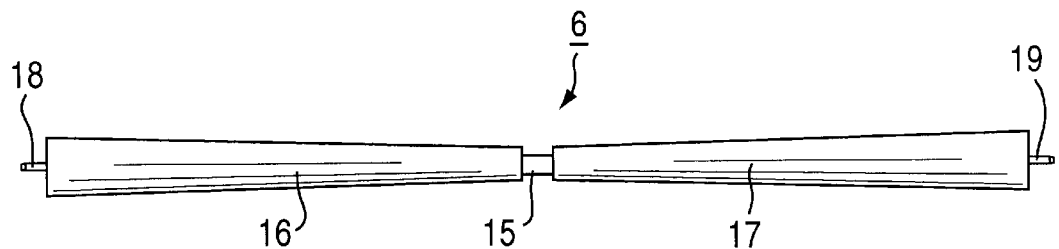
FIG. 5(a) to FIG. 5(e) are respectively diagrams illustrating a structure of a transfer roller.

As shown in FIG. 5(a), the transfer roller 6 has a structure in which a pair of approximately truncated-corn shaped rolling members 16 and 17 is combined with a metallic shaft 15, and supporting shafts 18 and 19 are respectively extended from both ends of the shaft 15. Note that the rolling members 16 and 17 are formed in the same size and with materials having a high frictional resistance and flexibility, such as synthetic rubber.

Figure 5B:
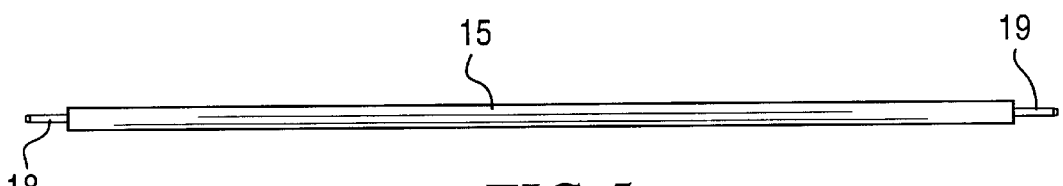

As shown in a plane view of FIG. 5(b), the shaft 15 is an axial shaft formed with a predetermined diameter and length. The supporting shafts 18 and 19 are each designed with a predetermined length and a predetermined diameter which is smaller than that of the shaft 15.

Figure 5C:
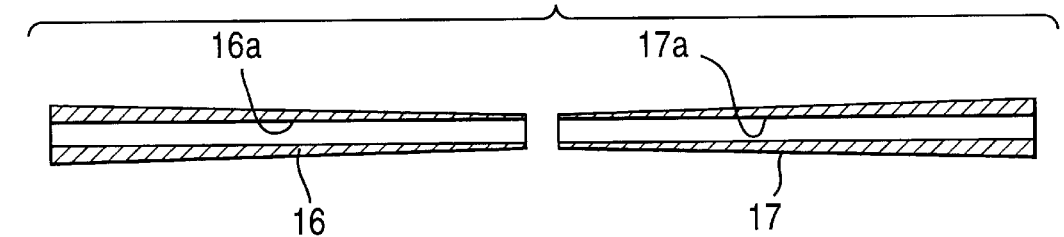

As shown in a sectional view of FIG. 5(c), the rolling members 16 and 17 are respectively provided therein with through-holes 16a and 17a with equal internal diameter, extending in the longitudinal direction to insert the shaft 15 therein. Each external diameter of the rolling members 16 and 17 is designed to have a fixed inclination to widen toward the supporting shaft 18 or 19, so that the thickness of the rolling member is increased along toward the supporting shaft 18 or 19.

The shaft 15 is inserted in the through-holes 16a and 17a of the rolling members 16 and 17, of which a central area is exposed by positioning the smaller-diameter end portions of the rolling members 16 and 17 to oppose to each other on the shaft 15 with a fixed gap. As shown in a sectional view of FIG. 5(d), end portions 16b and 17b on the larger diameter sides of the rolling members 16 and 17 overlap respective parts of the supporting shafts 18 and 19, thus forming the transfer roller 6.

Accordingly, clearances 20 and 21 respectively surrounded by the through-holes 16a and 17a and the supporting shafts 18 and 19, are respectively formed in the end portions 16b and 17b of the rolling members 16 and 17. Respective parts of the supporting shafts 18 and 19, which protrude from the clearances 20 and 21, are rotatably supported by movable members 24 and 25 described hereinafter. Note that the clearances 20 and 21 may be sealed with elastic materials more flexible than that of the rolling members 16 and 17.

As shown in FIG. 2(a), side walls 22 and 23 are integrally formed, respectively, on both sides of the chassis 5 adjacent to the opening 4. As shown in FIG. 3 (a side elevational view from the side wall 23) and FIG. 4 (a side elevational view from the side wall 22), the movable members 24 and 25 are pivotally supported on the respective side walls 22 and 23. The supporting shafts 18 and 19 of the transfer roller 6 are rotatably supported between the movable members 24 and 25. The supporting shaft 19 is connected to the gear 11.

In addition, the transfer roller 6 is arranged to be perpendicular to the transferred direction X of the disc DS and parallel to the opening 4, and further, adapted to change space with respect to the recess portion 12 by moving up and down with the movable members 24 and 25.

Figure 4A:
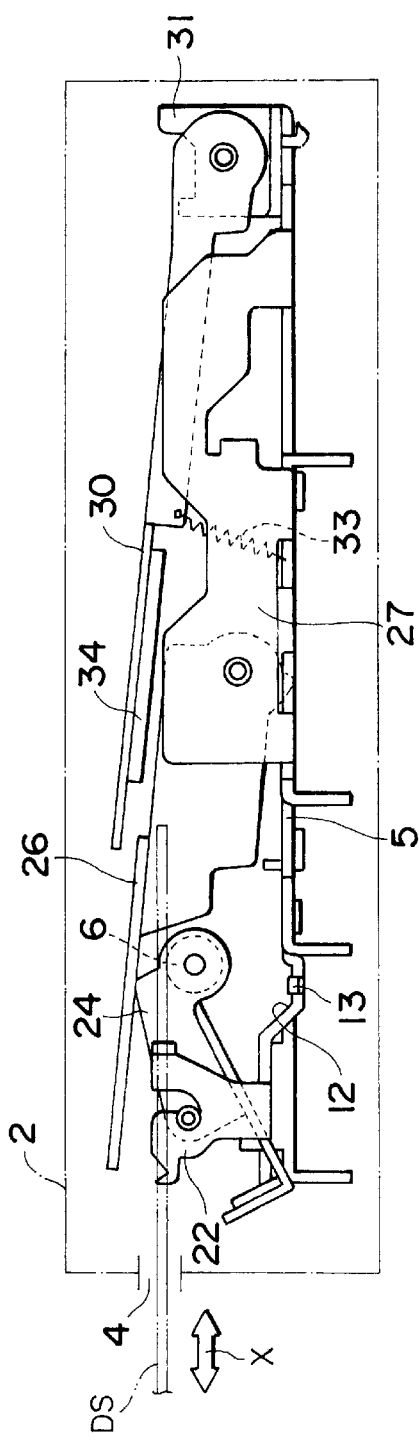
FIG. 4(a) and FIG. 4(b) are respectively side elevational views showing the arrangement from another side face of the recording-medium transfer device.

It should be mentioned that a guide member, which is not shown in FIG. 3(a) and FIG. 4(a), is provided in the vicinity of the inside of the opening 4 for guiding the disc DS in the transferring direction X while retaining it approximately horizontally at the height of the transfer roller 6 and the opening 4 in the transferring operation by the transfer roller 6.

As shown in FIG. 3(a) and FIG. 4(a), when the movable members 24 and 25 are shifted upward, the gear 11 is meshed with the gear 10 which is continually driven by the driving motor 7, so that the transfer roller 6 is rotated and contacts with the disc DS inserted from the opening 4, thus allowing the disc DS to be loaded.

When the disc DS is ejected, the driving motor 7 rotates in reverse, so that the transfer roller 6 is also rotated in reverse and comes in contact with the disc DS, thus transferring the disc back toward the opening 4.

Figure 4B:
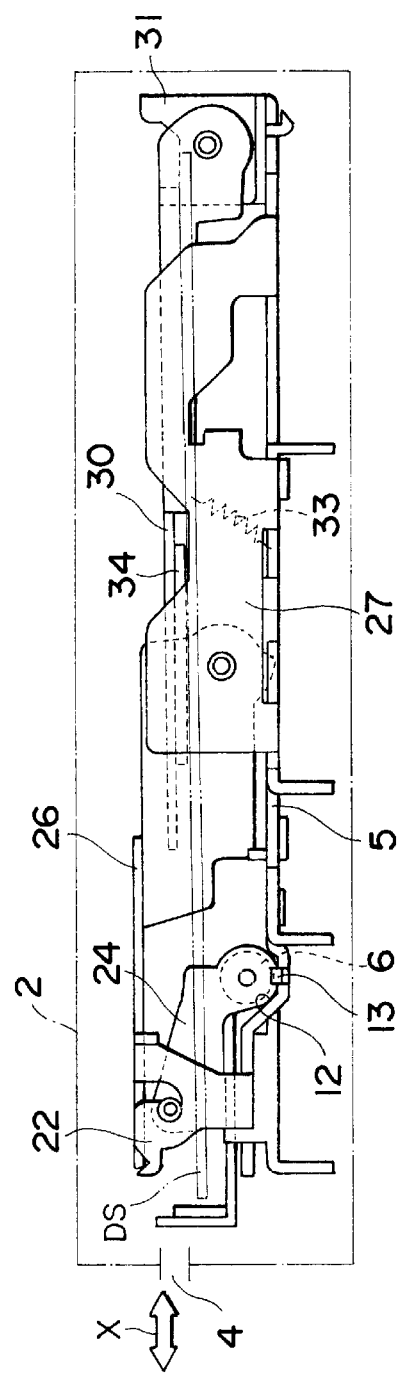

As shown in FIG. 3(b) and FIG. 4(b), when the movable members 24 and 25 are shifted toward the downmost position, the gear 11 is disengaged from the gear 10 and the lower portion of the transfer roller 6 is received into the recess portion 12, while the end portions 16b and 17b on the larger diameter sides of the rolling members 16 and 17 are respectively pressed onto the projecting portions 13 and 14.

Figure 5D:
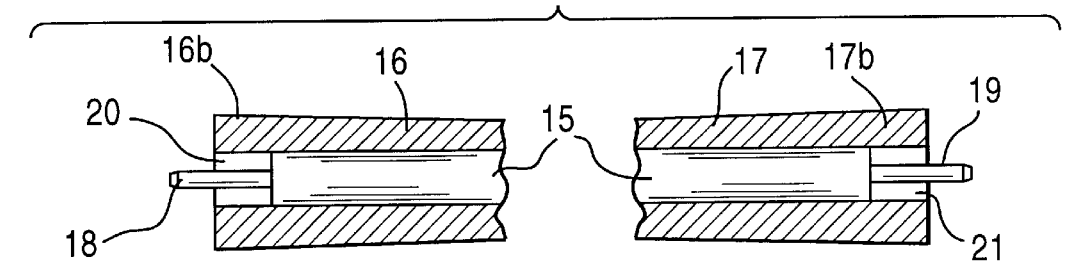
Figure 5E:
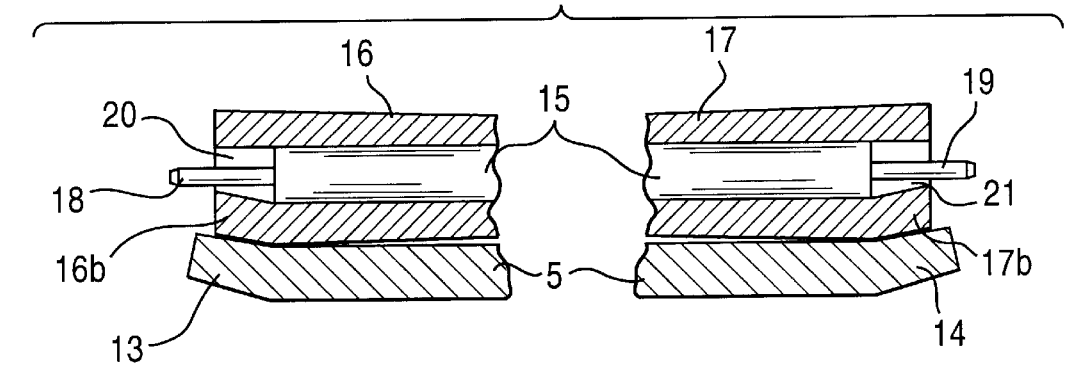

As explained above, when the end portions 16b and 17b on the larger diameter sides of the rolling members 16 and 17 are respectively pressed onto the projecting portions 13 and 14, as shown in the sectional view of FIG. 5(e), the end portions 16b and 17b are respectively pushed by the projecting portions 13 and 14 and deformed toward the clearances 20 and 21, so that contact resistance between the end portions 16b and 17b and the corresponding projecting portions 13 and 14 is increased, whereby the transfer roller 6 is assuredly fixed on the chassis 5.

Note that the pivotal shift operation of the movable members 24 and 25 is carried out by an actuator (not shown) mounted on the chassis 5.

In FIG. 3 and FIG. 4, a first upper plate member 26 which shifts upward/downward to open/close space above a side of the opening 4 is supported by side walls 27 respectively standing on both sides of the chassis 5. A coil spring 28 is provided between the first upper plate member 26 and the movable member 25. For easier understanding, FIG. 3 omits to show the side wall for supporting the first upper plate member 26. As typically illustrated in FIG. 3(a), a disc guide member 26a is provided on the back face of the first upper plate member 26 in order to perform the loading or discharging of the disc in a predetermined direction by means of abutting against the top face of the disc DS and urging the disc DS onto the rolling members 16 and 17 when the disc DS is inserted or ejected (discharged).

As shown in FIG. 3(a) and FIG. 4(a), upon shifting the movable members 24 and 25 upward, the upper ends of the movable members 24 and 25 push up the first upper plate member 26 so as to also shift the first upper plate member 26 upward, thus allowing the transfer roller 6 to perform the loading and ejecting of the disc DS.

On the other hand, as shown in FIG. 3(b) and FIG. 4(b), when the movable members 24 and 25 are shifted downward after the disc DS has been transferred to a predetermined cramping position, the first upper plate member 26 is pulled by the coil spring 28 to be shifted downward. Thus, the disc DS is loaded on a turntable 29 described hereinafter. The turntable 29 is mounted to be directly connected to a driving shaft of a servomotor (not shown) provided in an approximately central portion of the chassis 5. In the recording-reproducing process, the turntable 29 and the disc DS are combinedly rotated by receiving a turning force from the servomotor.

A second upper plate member 30 which shifts upward/downward to open/close space above a side of the opening 4 is supported by side walls 31 and 32 respectively standing on both backward sides of the chassis 5. Between the second upper plate member 30 and the chassis 5, a coil spring 33 is provided. On the under face of the second upper plate member 30, a clamp member 34 is provided for pressing the disc DS to be loaded on the turntable 29 from above.

The pivotal shift operation of the first and second upper plate members 26 and 30 is controlled by the actuator (not shown) As shown in FIG. 3(b) and FIG. 4(b), when the second upper plate member 30 is shifted downward, the disc DS is clamped between the clamp member 34 and the turntable 29 to be capable of recording and reproducing. On the other hand, when the second upper plate member 30 is shifted upward as shown in FIG. 3(a) and FIG. 4(a), the clamp member 34 is moved apart from the turntable 29, to allow the disc DS loaded on the turntable 29 to be discharged or allow a new disc DS to be loaded.

In FIG. 2(a), on the face of the chassis 5, an optical pickup 35 is provided to move toward or away from the rotating center of the turntable 29. More specifically, a pair of shafts 36 and 37 and a worm gear 38 interlocked with a driving motor (not shown) are mounted on the face of the chassis 5. The optical pickup 35 is slidably supported by the shafts 36 and 37. An extended portion 39 formed at one end of the optical pickup 35 is engaged with the worm gear 38. In the optical pickup 35, an objective lens 40 for irradiating a light beam onto a recorded-reproduced face of the disc DS loaded on the turntable 29 and detecting the reflected light is provided. When the worm gear 38 is rotated by the above driving motor, the optical pickup 35 is moved toward or away from the turntable 29 in accordance with the amount of rotating of the worm gear 38, and then reading/writing of information from/onto tracks on the disc DS facing the objective lens 40 is carried out.

The operation of the recording-medium transfer device having the aforementioned structure will be explained below. After the user inserts a disc DS in the opening 4, the photosensor P1 shown in FIG. 2(a) optically detects the inserted edge of the disc DS. Responding to the detected result, the first and second upper plate members 26 and 30 are shifted upward and the transfer roller 6 is also moved up as shown in FIG. 3(a) and FIG. 4(a). Next, the driving motor 7 starts a rotary driving, so that while being in contact with the disc DS, the transfer roller 6 mechanically transfers the disc DS toward the clamping position at which the turntable 29 is located. It should be mentioned that since the rolling members 16 and 17 of the transfer roller 6 are each formed in a truncated-corn shape having an increased thickness toward its end portion 16b or 17b as shown in FIG. 5(a), the disc DS is centered toward the axis of the turntable 29 while being transferred.

When the disc DS reaches the above clamping position, as shown in FIG. 3(b) and FIG. 4(b), the transfer roller 6 and the first and second upper plate members 26 and 30 are moved down, at the same time, and then the driving motor 7 stops. The transferring operation by the transfer roller 6 thus finishes, and the disc DS is clamped between the turntable 29 and the clamp member 34, to allow the recording-reproducing operation of the disc DS.

After finishing the transferring operation by the transfer roller 6, since the end portions 16*b* and 17*b* of the rolling members 16 and 17 are respectively pressed onto the projecting portions 13 and 14 and deformed toward the clearances 20 and 21, the contact resistance between the end portions 16*b* and 17*b* and the corresponding projecting portions 13 and 14 is increased, thereby fixing the transfer roller 6 onto the chassis 5 with reliability.

Next, when the user operates the ejecting button while clamping the disc DS between the turntable 29 and the clamp member 34, the first and second upper plate members 26, 30, and the transfer roller 6 are moved upward similar to FIG. 3(*a*) and FIG. 4(*a*). In consequence, the disc DS rises upward with the upward motion of the transfer roller 6, and separates from the turntable 29 and the clamp member 34. The driving motor 7 starts rotating in reverse, and the transfer roller 6 is also rotated in reverse therewith, whereby the disc DS is ejected toward the opening 4.

In the ejecting process, when the photosensor P2 detects the inserted edge portion of the disc DS, the driving motor 7 stops. Accordingly, the ejecting operation is stopped under a condition that a part of the disc DS is in contact with the transfer roller 6, and only the last process of ejecting (pulling out) the disc DS is dependent on the user.

After another photosensor or the like detects that the user takes out the disc DS and then the final confirmation of the ejecting operation is performed, the first and second upper plate members 26 and 30 and the transfer roller 6 are moved down as shown in FIG. 3(*b*) and FIG. 4(*b*), into a waiting state. In this waiting state, the end portions 16*b* and 17*b* of the rolling members 16 and 17 are still respectively pressed onto the projecting portions 13 and 14 and deformed toward the clearances 20 and 21, so that the contact resistance between the end portions 16*b* and 17*b* and the corresponding projecting portions 13 and 14 is increased, whereby the transfer roller 6 is assuredly fixed on the chassis 5. Moreover, after the disc DS is taken out, one end of the disc guide member 26*a* provided in the first upper plate member 26 is abutted to the rolling members 16 and 17, so that the transfer roller 6 is further fixed. Thus, it is also avoided that the transfer roller 6 produces chatter or the like when receiving outside vibration. According to the embodiment, when the transfer roller 6 does not transfer the recording medium, the flexible end portions 16*b* and 17*b* are pressed onto the respective projecting portions 13 and 14, and further, the end portions 16*b* and 17*b* are deformed toward the respective clearances 20 and 21, so as to increase the contact resistance between the end portions 16*b* and 17*b* of the rolling members 16 and 17 and the corresponding projecting portions 13 and 14, thereby the transfer roller 6 is assuredly fixed on the chassis 5 even when the recording-reproducing device 1 for mounting on the vehicle is vibrated. In consequence, the anti-rattle construction capable of preventing occurrence of vibration causing chatter or the like, in the device as the conventional disadvantage, is achieved. Moreover, since the anti-rattle construction is extremely simple, increase of production cost can be avoided.

It should be mentioned that, after the disc DS has been discharged, the transfer roller 6 is pressed into the recess portion 12 on the chassis 5 in the above modification, but may be also pressed onto the first upper plate member 26. According to the structure, chatter or the like can be avoided during the waiting state by pressing the transfer roller 6 onto the first upper plate member 26 and during the reproducing state by pressing it onto the chassis 5.

Next, a modification of the embodiment will be described with reference to FIG. 6. FIGS. 6(*a*) to 6(*e*) show a structure of the transfer roller 6 in correspondence with FIGS. 5(*a*) to 5(*e*).

Referring to FIG. 6(*c*), in end portions 16*b*' and 17*b*' on the larger diameter sides of the rolling members 16 and 17, hollows 16*c* and 17*c* each having an interior diameter larger than that of the through-hole 16*a* or 17*a* are formed. The shaft 15 is inserted in the rolling members 16 and 17 as structured above. The central portion of the shaft 15 is exposed by positioning the end portions on the smaller diameter sides of the rolling members 16 and 17 to be opposite each other with a predetermined gap. As shown in a sectional view of FIG. 6(*d*), both ends of the shaft 15 are approximately aligned with the respective end portions 16*b*' and 17*b*' on the larger diameter sides of the rolling members 16 and 17.

Accordingly, between the end portions 16*b*' and 17*b*' of the rolling members 16 and 17 and the shaft 15, clearances 20' and 21' created by the hollows 16*c* and 17*c* are formed respectively. The supporting shafts 18 and 19 are rotatably supported by the movable members 24 and 25 as shown in FIG. 2(*a*).

According to the above structure, when the transfer roller 6 is moved down toward the chassis 5 as shown in FIG. 3(*b*) and FIG. 4(*b*), the end portions 16*b*' and 17*b*' of the rolling members 16 and 17 are respectively pressed onto the projecting portions 13 and 14, and further, deformed toward the clearances 20' and 21' as shown in FIG. 6(*e*). Therefore, the contact resistance between the end portions 16*b*' and 17*b*' and the corresponding projecting portions 13 and 14 is increased, thereby assuredly fixing the transfer roller 6 onto the chassis 5 so as to achieve the anti-rattle construction.

FIG. 5 illustrate the structure in which the clearances 20 and 21 are respectively formed by overlapping the supporting shafts 18 and 19 with the corresponding end portions 16*b* and 17*b* of the rolling members 16 and 17, while FIG. 6 illustrate the structure in which the clearances 20' and 21' are respectively formed inside the end portions 16*b*' and 17*b*' of the rolling members 16 and 17. A structure using both those grooves may be applied.

Another modification of the embodiment will be explained below with reference to FIG. 7. FIGS. 7(*a*), 7(*b*) and 7(*c*) show a structure of the transfer roller 6 in correspondence with FIGS. 5(*a*), 5(*d*) and 5(*e*).

In FIGS. 7(*a*) and 7(*b*), the shaft 15 of the modification includes a central portion 41 of a predetermined length and a smaller diameter than that of other portions, as shown in the area with a chain line of the drawing. The shaft 15 is inserted in the rolling members 16 and 17 shown in FIG. 5(*c*) or FIG. 6(*c*). However, end portions 16*d* and 17*d* on the smaller diameter sides of the rolling members 16 and 17 overlaps the central smaller diameter portion, so that clearances 42 and 43 are respectively formed between the end portions 16*d* and 17*d* and the central portion 41. The supporting shafts 18 and 19 are rotatably supported by the movable members 24 and 25 as shown in FIG. 2(*a*).

In the modification, a projecting portion 44 opposed to the central portion 41 of the shaft 15 is formed in a middle portion of the recess portion 12 of the chassis 5.

According to the above structure, when the transfer roller 6 is moved down toward the chassis 5 as illustrated in FIG. 3(*b*) and FIG. 4(*b*), the end portions 16*d* and 17*d* of the rolling members 16 and 17 are pressed onto the projecting portion 44 and respectively deformed toward the clearances 42 and 43 as shown in FIG. 7(*c*), so that the contact resistance between the projecting portion 44 and each of the end portions 16*d* and 17*d* is increased so as to assuredly fix the transfer roller 6 onto the chassis 5, resulting in the achievement of the anti-rattle construction.

Still another modification of the embodiment will be explained below with reference to FIG. 8. FIGS. 8(*a*) to 8(*c*)

show a structure of the transfer roller 6 in correspondence with FIGS. 7(a) to 7(c).

In FIGS. 8(a) and 8(b), the rolling members 16 and 17 of the modification is provided with hollows, each having an interior diameter larger than that of the through-hole 16a or 17a, in the area indicated with a chain line in the drawing, i.e. inside the end portions 16d' and 17d'. Clearances 45 and 46 are respectively formed between the shaft 15 and the end portions 16d' and 17d' by the above-mentioned hollows. In the modification also, the projecting portion 44 opposed to the central portion of the shaft 15 is formed in a middle portion of the recess portion 12 of the chassis 5.

According to the above structure, when the transfer roller 6 is moved down toward the chassis 5 as illustrated in FIG. 3(b) and FIG. 4(b), the end portions 16d' and 17d' of the rolling members 16 and 17 are pressed onto the projecting portion 44 and respectively deformed toward the clearances 45 and 46 as shown in FIG. 8(c), so that the contact resistance between the projecting portion 44 and each of the end portions 16d' and 17d' is increased so as to assuredly fix the transfer roller 6 onto the chassis 5, resulting in the achievement of the anti-rattle construction.

FIG. 7 illustrates the structure in which the clearances 42 and 43 are respectively formed by overlapping the central portion 41 having a smaller diameter than the other portion of the shaft 15 with the rolling members 16 and 17, while FIG. 8 illustrate the structure in which the clearances 45 and 46 are respectively formed inside the end portions 16d' and 17d' of the rolling members 16 and 17. A structure using both those grooves may be applied.

Figure 9:
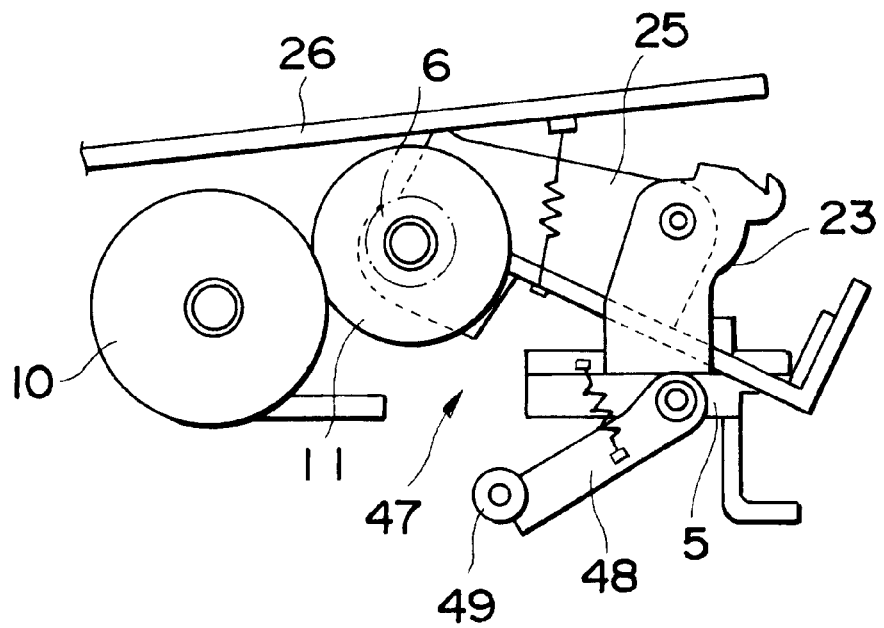
FIG. 9(a) and FIG. 9(b) are respectively side elevational views showing an arrangement of a modification of the recording-medium transfer device.
Figure 9:
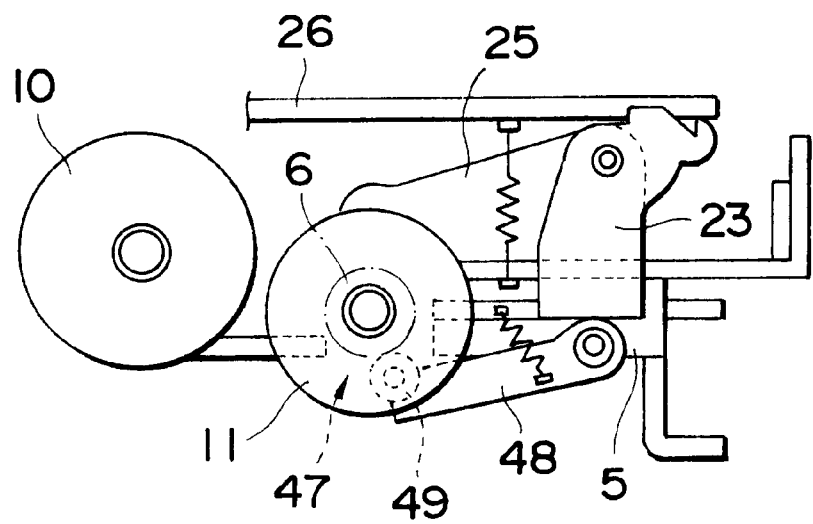

Yet another modification of the embodiment will be explained below with reference to FIG. 9. FIGS. 9(a) and 9(b) show the transfer roller 6 and a supporting structure around the side wall 23 and movable member 25, shown in FIGS. 3(a) and 3(b).

In the modification, instead of the aforementioned recess portion 12 on the chassis 5, a through-hole 47 is provided on the chassis 5. In other words, this modification has no projecting portion as described in the above-mentioned modification.

In addition, an arm member 48 is pivotally and rotatably mounted on at least one side of the chassis 5. On a distal end of the arm member 48, an abutment portion 49 pressing against the transfer roller 6 through the through-hole 47 is provided.

More specifically, in use of the transfer roller 6 shown in FIG. 5, for example, the abutment portions 49 pressing against the end portions 16b and 17b of the rolling members 16 and 17 through the through-holes 47 are each provided on the distal end of the arm member 48 which is provided on both sides of the chassis 5 along the roller 6, respectively.

When the transfer roller 6 is moved upward as shown in FIG. 3(a) and FIG. 4(a), the arm member 48 is pivotally shifted downward to be separated from the through-hole 47 linking with the upward motion of the transfer roller 6. On the other hand, the arm member 48 is pivotally shifted up toward the through-hole 48 linking with the downward motion of the transfer roller 6 as shown in FIG. 3(b) and FIG. 4(b), so that the abutment portions 49 press against the transfer roller 6 through the through-hole 47.

Figure 6A:
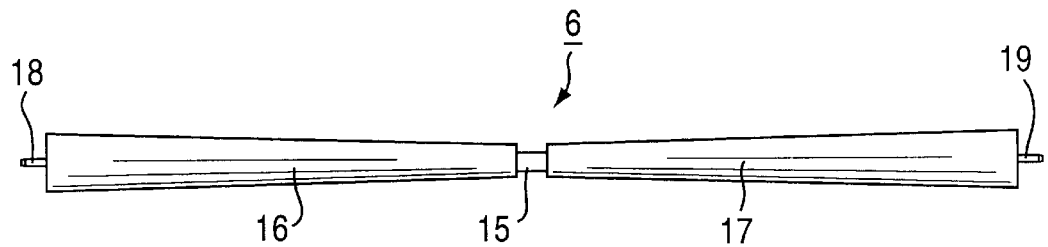
FIG. 6(a) to FIG. 6(e) are respectively diagrams illustrating a structure of a modification of the transfer roller.
Figure 6B:
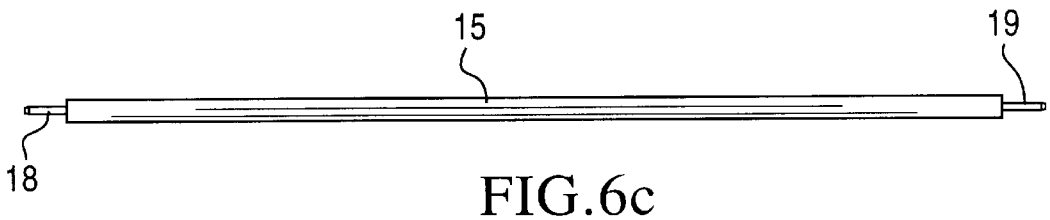
Figure 6C:
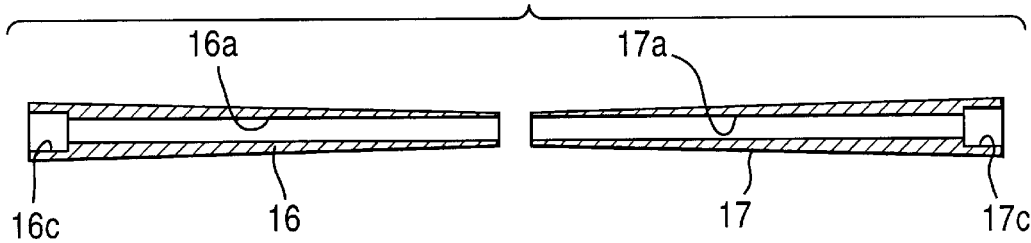
Figure 6D:
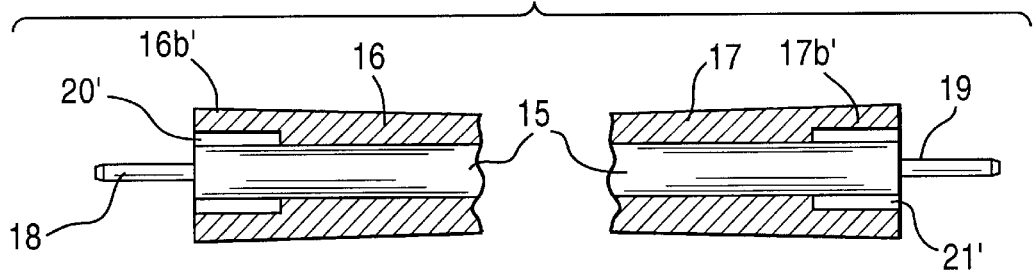
Figure 6E:
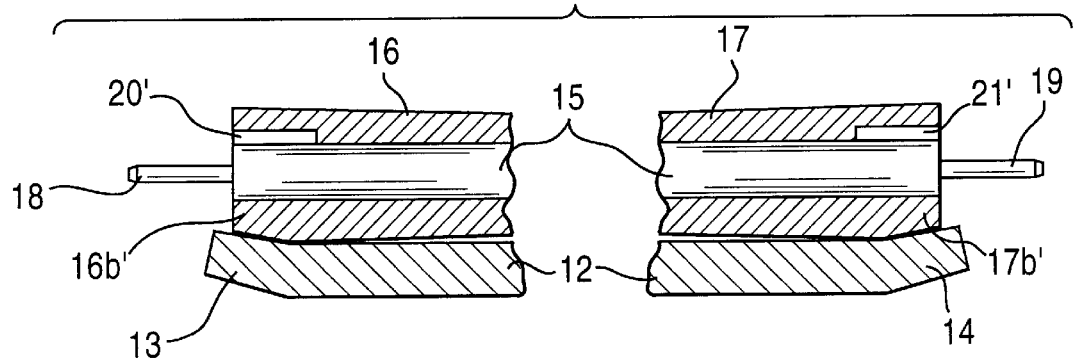

According to the above structure, when the transfer roller 6 is moved down toward the chassis 5 as shown FIG. 9(b), each of the end portions 16b, 17b, 16b' and 17b' of the rolling members 16 and 17 shown in FIGS. 5 and 6 is pressed and deformed by the abutment portion 49, so that the transfer roller 6 can be assuredly fixed onto the chassis 5 similarly the cases shown in FIGS. 5(e) and 6(e), so as to result in the achievement of the anti-rattle construction.

In the first embodiment as described above, each of the abutting portions 16b, 17b and so on which are respectively abutted with the projecting portions 13, 44 and so on as abutment means, is provided at the end portion or the central portion of the transfer roller 6. However, the abutting portion 16b, 17b or the like in all the modifications may be provided at any position other than the end portion or the central portion of the transfer roller 6.

(Second Embodiment)

The second embodiment will be described hereinafter with reference to FIG. 10 to FIG. 13. Note that a recording-medium transfer device according to the second embodiment has a structure similar to that disclosed in Japanese Patent Application No. 10-107265 that was filed by the present applicant, and so the details of the structure are omitted and only points having relationship with the present application will be explained here.

Figure 10:
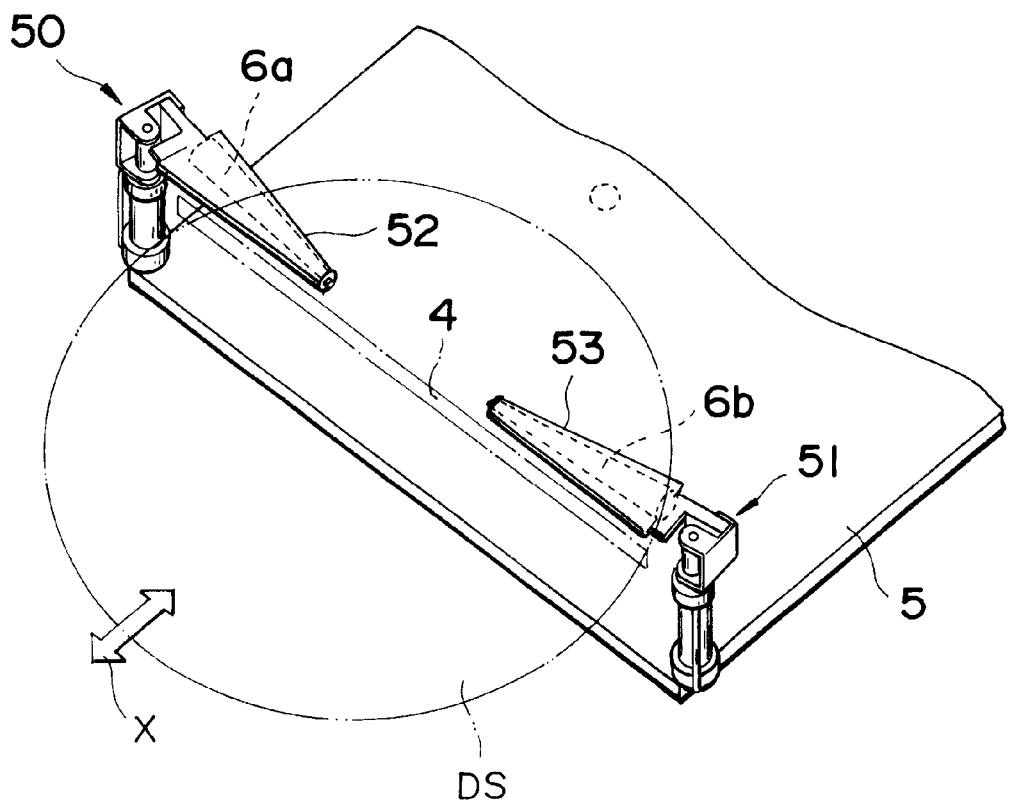
FIG. 10 is a perspective view showing an arrangement of a recording-medium transfer device according to a second embodiment.
Figure 12:
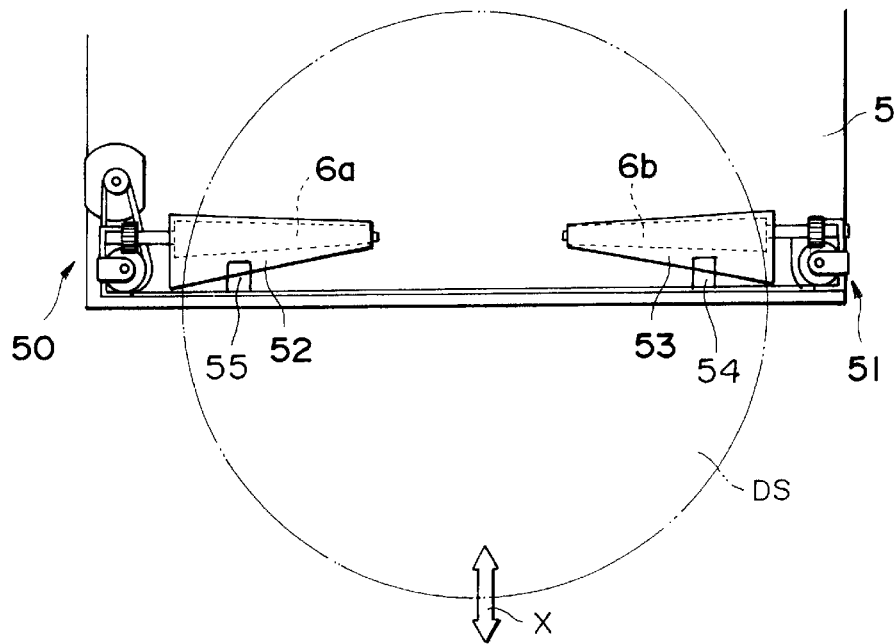
FIG. 12 is a plane view for explaining operation of the recording-medium transfer device shown in FIG. 10.
Figure 13:
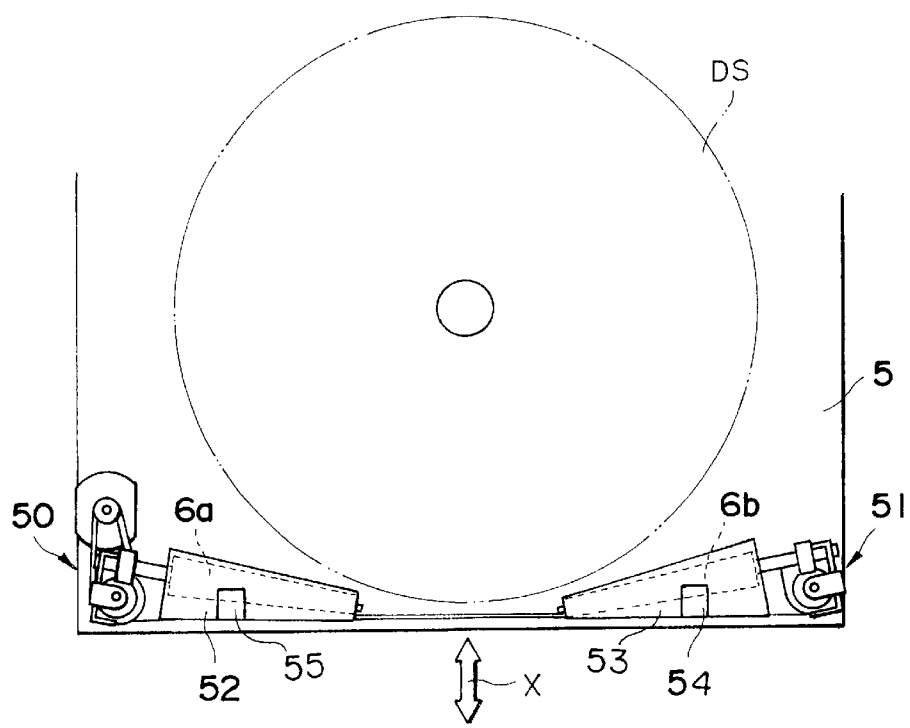
FIG. 13 is a plane view for further explaining the operation of the recording-medium transfer device shown in FIG. 10.

Referring to FIG. 10, in the recording-medium transfer device, arm members 52 and 53 respectively provided with transfer rollers 6a and 6b are rotatably supported by the respective support mechanisms 50 and 51 standing on both sides of the chassis 5. The arm members 52 and 53 are rotatably driven by a driving motor or gear mechanism (not shown) provided in the supporting mechanisms 50 and 51. As shown in FIG. 12 and FIG. 13, the transfer rollers 6a and 6b and the arm members 52 and 53 are adapted to pivotally shift in the horizontal direction with respect to the transferred direction X of the disc DS.

Similar to the structure shown in FIG. 5 and FIG. 6, the transfer rollers 6a and 6b have the structure in which shafts as an axial shaft are respectively inserted in the approximately truncated-corn shaped rolling members 16 and 17, and a clearance similar to the clearances 20, 21, 20', and 21' is formed in each end portion on the larger diameter side of the rolling members.

Figure 11:
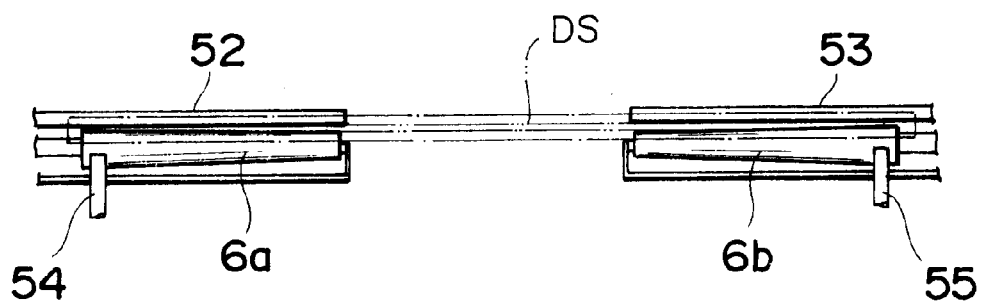
FIG. 11 is a side elevational view showing the arrangement of the recording-medium transfer device shown in FIG. 10 from an insertion opening.

As shown in FIG. 11, abutment means 54 and 55 extending from the chassis 5 stand in the respective vicinities of the transfer rollers 6a and 6b closer to the supporting mechanisms 50 and 51. As shown in FIG. 12, when the transfer rollers 6a and 6b are aligned in a direction perpendicular to the direction X of transferring the recording medium, the transfer rollers 6a and 6b respectively separate from the abutment means 54 and 55. Furthermore, as shown in FIG. 13, when the transfer rollers 6a and 6b are slanted with respect to the direction X of transferring the recording medium, the transfer rollers 6a and 6b and the corresponding abutment means 54 and 55 are respectively and mutually pressed.

In the above structure, when the user inserts the disc DS into the opening 4, the transfer rollers 6a and 6b are respectively aligned in the direction perpendicular to the direction X of transferring the recording medium as shown in FIG. 12, and rotated keeping in contact with the disc DS, so as to transfer the disc DS to the clamping position located in the inner portion of the chassis 5.

When the disc DS reaches the cramping position, as shown in FIG. 13, the transfer rollers 6a and 6b are respectively turned with respect to the direction X of transferring the recording medium to move away from the disc DS. After that, similarly to the first embodiment, the disc DS is clamped between the turntable and the clamp member, and then recording and reproducing through the optical pickup is carried out.

When the transfer rollers 6a and 6b are turned with respect to the direction X of transferring the recording medium, the end portions on the larger diameter sides of the transfer rollers 6a and 6b are deformed by pressing themselves on the abutment means 54 and 55, as explained above. Accordingly, since frictional resistance between the transfer rollers 6a and 6b and the corresponding abutment means 54 and 55 is increased, the transfer rollers 6a and 6b are assuredly fixed to the abutment means 54 and 55, resulting in the achievement of the anti-rattle construction.

In the case also that the disc DS is discharged, the transfer rollers 6a and 6b are adapted to be turned with respect to the direction X of transferring the recording medium similarly to FIG. 13, so that the transfer rollers 6a and 6b are also assuredly fixed to the abutment means 54 and 55, thereby also effecting the anti-rattle construction.

In the second embodiment, the abutment means 54 and 55 are abutted to the both exterior end portions of the transfer roller 6. However, the abutment means 54 and 55 may be abutted to other portions of the transfer roller 6.

(Third Embodiment)

Figure 14:
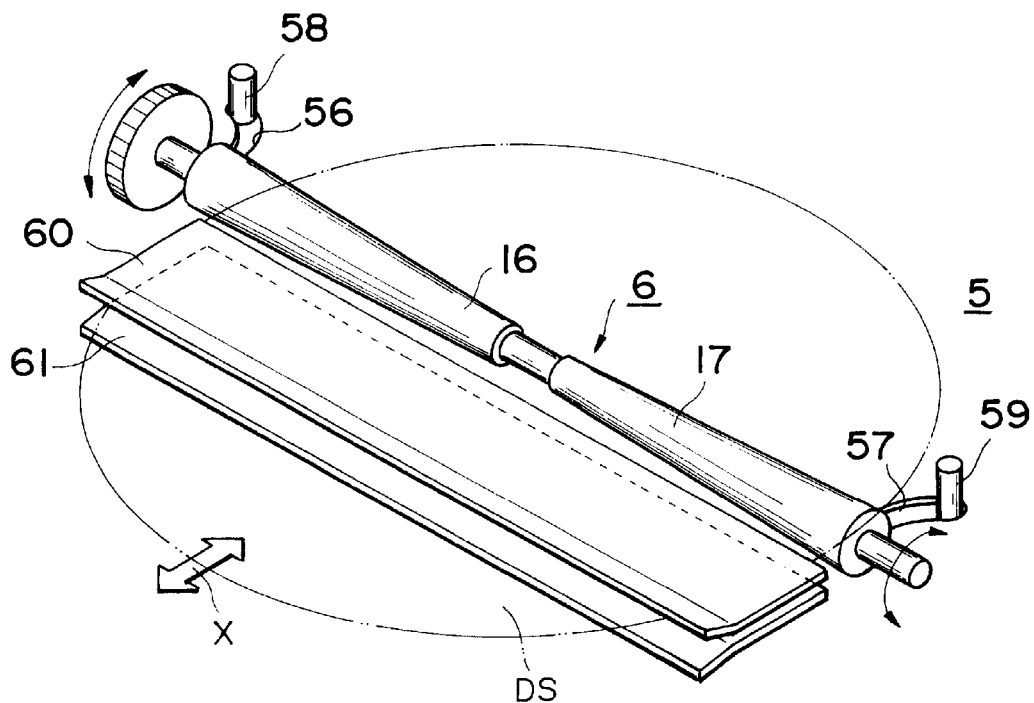
FIG. 14 is a perspective view showing an arrangement of a recording-medium transfer device according to a third embodiment.
Figure 15:
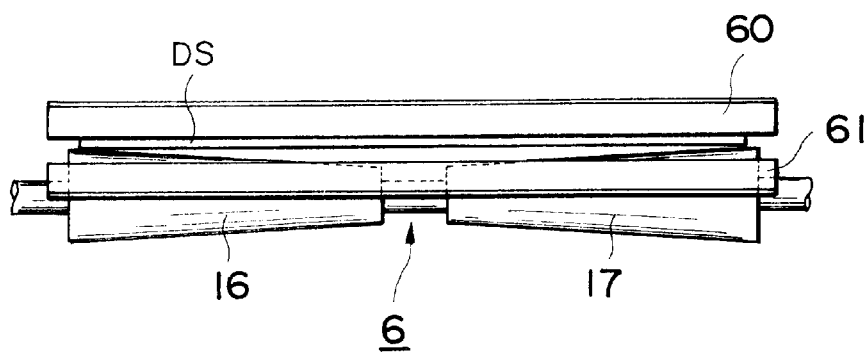
FIG. 15 is a side elevational view showing the arrangement of the recording-medium transfer device shown in FIG. 14 from an opening.
Figure 16:
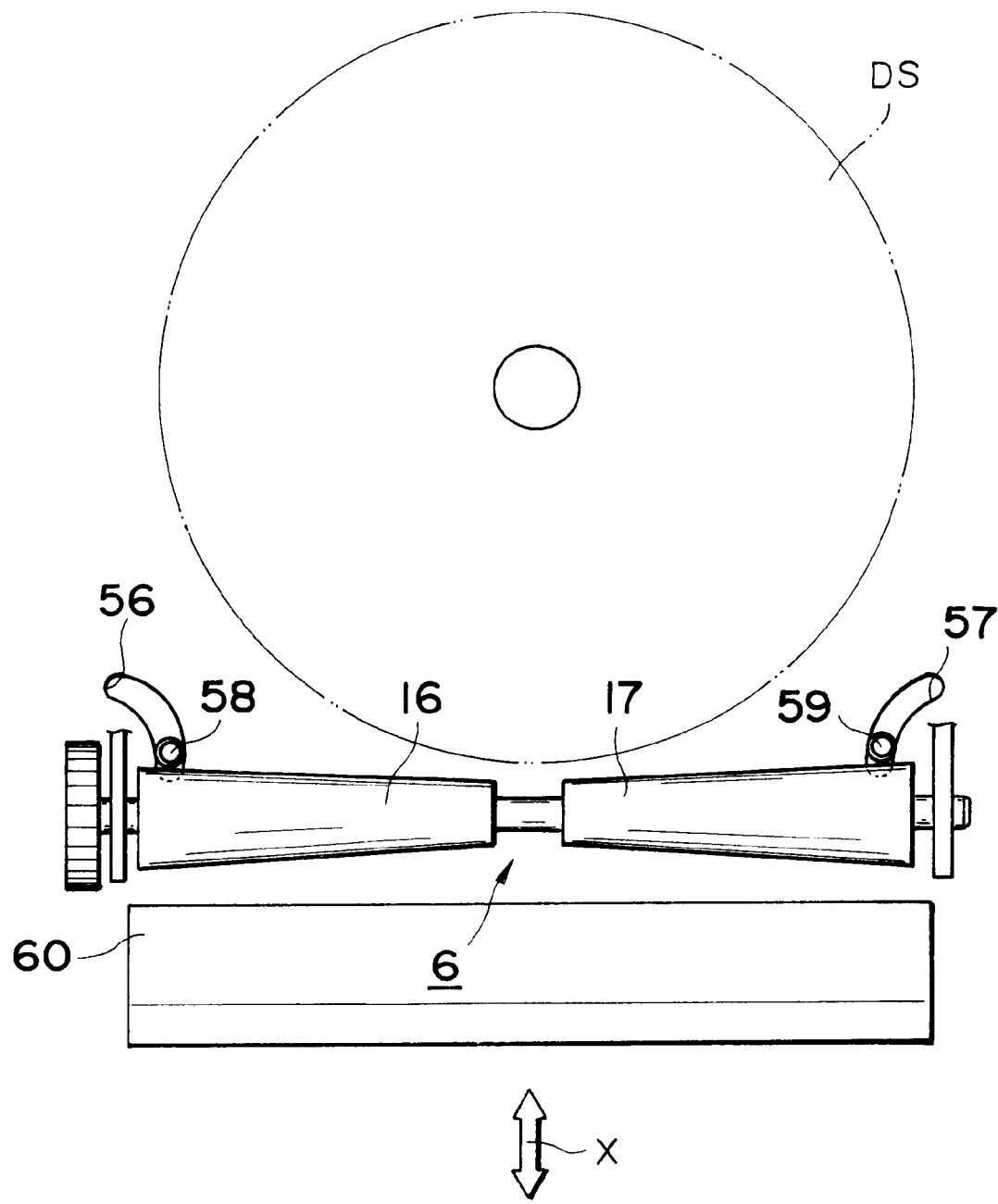
FIG. 16 is a plane view for explaining operation of the recording-medium transfer device shown in FIG. 14.

The third embodiment will be described below with reference to FIG. 14 to FIG. 16. The first embodiment has explained about the case where the transfer roller 6 is vertically shifted with respect to the transferred direction X of the disc DS. The second embodiment has explained about the case where the transfer rollers 6a and 6b are horizontally shifted with respect to the transferred direction X of the disc DS. In FIG. 14 to FIG. 16 of the third embodiment, however, the transfer roller 6 is supported to rotate at the regular position.

In FIG. 14, a pair of cam grooves 56 and 57 are provided on the chassis 5 in the vicinities of both ends of the transfer roller 6. In the cam grooves 56 and 57, abutment means 58 and 59 each of which is moved by an actuator (not shown) are inserted respectively. Similar to the structure shown in FIGS. 5 or FIGS. 6, the transfer roller 6 has the structure in which an axial shaft is inserted in the approximately truncated-corn shaped rolling members 16 and 17, and a clearance similar to the clearances 20, 21, 20', and 21' is formed in each end portion on the larger diameter side of the rolling members.

In addition, a pair of upper and lower plate-shaped guide members 60 and 61 for transferring the disc DS and allowing the disc DS to be in contact with the faces of the rolling members 16 and 17, are provided to be approximately opposed to the transfer roller 6.

In the above arrangement, when the user inserts the disc DS in between the guide members 60 and 61 through the opening 4, as shown in FIG. 14 and FIG. 15, the transfer roller 6 is rotated keeping in contact with the disc DS, and transfers the disc DS to the clamping position located in the inner position of the chassis 5. In insertion of the disc DS, the abutment means 58 and 59 are respectively moved back to the inmost positions of the cam grooves 56 and 57, thereby allowing the transfer roller 6 to rotate, so that transferring the disc DS is not obstructed.

As shown in FIG. 16, after the disc DS reaches the clamping position, the disc DS is clamped between the turntable and the clamp member, and the recording and reproducing through the optical pickup is carried out, as explained in the first embodiment. At the same time, the abutment means 58 and 59 are respectively moved along the cam grooves 56 and 57 to press the end portions on the larger diameter sides of the rolling members 16 and 17, thereby, similar to the structure shown in FIG. 5(e) and FIG. 6(e), the end portions on the larger diameter sides of the rolling members 16 and 17 are deformed, so that the frictional resistance between the rolling members 16 and 17 and the corresponding abutment means 58 and 59 is increased. Accordingly, the transfer roller 6 is assuredly fixed to the abutment means 58 and 59, resulting in the achievement of the anti-rattle construction.

In the case also that the disc DS is ejected, the abutment means 58 and 59 respectively press the end portions on the larger diameter sides of the rolling members 16 and 17 similar to FIG. 16, so that the frictional resistance between the rolling members 16 and 17 and the corresponding abutment means 58 and 59 is also increased, thereby the transfer roller 6 is assuredly fixed to the abutment means 58 and 59, resulting in the achievement of the anti-rattle construction.

It should be mentioned that the aforementioned first, second and third embodiments are only examples for explaining the subject matter of the present invention. Therefore, the disc transfer device relating to the present invention are not intended to be limited to those embodiments, but combinations or variations of such embodiments are also included in the scope of the present invention.

Moreover, a plurality of slit-shaped groove portions may be formed on the interior walls of the end portions 16b and 17b of the larger diameter sides shown in FIG. 5(d), along the longitudinal direction of the shaft 15, so as to increase the amount of deformation occurred when the end portions 16b and 17b respectively press the projecting portions 13 and 14, thereby the transfer roller 6 may be further firmly fixed to the chassis 5. For obtaining the same effect, radiate groove portions may be formed also on the exterior end portions of the projecting portions 13 and 14 along the radial direction.

Moreover, the abutment means 58 and 59 respectively abut against the exterior end portions of the rolling member 16, 17, but the abutment means 58 and 59 may abut against other portions of the transfer roller 6. Furthermore, it is explained that the abutment means 58 and 59 respectively abut against the rolling member 16, 17 from the lateral direction, but the abutment means 58 and 59 may be provided on the chassis and moved upward therefrom to abut against the rolling members 16, 17.

Furthermore, another member having the same function, which is formed of resilient materials and has clearances therein, may be provided independently of the transfer roller.

In short, any structure, in which when a plate, abutment means or the like presses a rolling member of a transfer roller, the pressed part is deformed toward the clearance to increase contact resistance between the transfer roller and the chassis, abutment means or the like, is included in the scope of the present invention.

The recording-medium transfer device according to the present invention is not limited to application to a recording-reproducing device used for a circular plate shaped optical disc, such as CD or DVD. Namely, the recording-medium transfer device can be applied to any recording medium insofar as it has a plate shape.

According to the present invention as described above, when a transfer roller is moved away from a disc, abutment means relatively presses an end portion of the transfer roller. The end portion having flexibility is deformed by being pressed, thereby increasing contact resistance between the abutment means and the transfer roller. In consequence, after completing of a loading process or an ejecting process, the transfer roller can be fixed to the abutment means so as not to move due to vibration or the like, resulting in achievement of a recording-medium transfer device having the silent construction based on the anti-rattle treatment.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A recording-medium transfer device for transferring a recording medium from a predetermined inserting position to a predetermined loading position or for ejecting the recording medium from the predetermined loading position to the predetermined inserting position, comprising:

at least one transfer roller for transferring and ejecting the recording medium; and abutment means for relatively pressing on an end of said transfer roller, wherein at least said end of the transfer roller pressed by said abutment means is made of an elastic material, and a clearance is formed in said transfer roller to permit deformation of said end which is produced through being pressed by said abutment means.

2. The recording-medium transfer device according to claim 1, wherein said transfer roller comprises at least one rolling member made of elastic material and a shaft for giving rotating force to said rolling member, said clearance being provided between said rolling member and said shaft.

3. The recording-medium transfer device according to claim 2, wherein said clearance comprises a groove formed on at least one or both of said rolling member and said shaft.

4. The recording-medium transfer device according to claim 1, wherein said transfer roller moves between a position for transferring the recording-medium and a waiting position having no contact with the recording-medium, and presses on said abutment means at the latter position.

5. The recording-medium transfer device according to claim 1 or 4, wherein said abutment means is a projecting portion formed on a chassis.

6. The recording-medium transfer device according to claim 1, wherein a central portion of said transfer roller has a smaller diameter than that of both ends so as to form a pair of approximately truncated-corn shapes.

7. The recording-medium transfer device according to claim 1, wherein said end of the transfer roller pressed by said abutment means is formed on at least one of both ends of said transfer roller.

8. The recording-medium transfer device according to claim 1, wherein said transfer roller is pressed by said abutment means at a central portion thereof.

9. The recording-medium transfer device according to claim 1, wherein said transfer roller is pressed by said abutment means at any portion thereof.

* * * * *

UNITED STATES PATENT AND TRADEMARK OFFICE
CERTIFICATE OF CORRECTION

PATENT NO. : 6,735,161 B1
DATED : May 11, 2004
INVENTOR(S) : Sato et al.

It is certified that error appears in the above-identified patent and that said Letters Patent is hereby corrected as shown below:

Title page,
Insert Item -- [30]    Foreign Application Priority Data
       Oct. 20, 1998    (JP) ……………………………….. 10-298133 --.

Signed and Sealed this

Seventeenth Day of August, 2004

JON W. DUDAS
*Acting Director of the United States Patent and Trademark Office*